Patented Aug. 18, 1953

2,649,432

UNITED STATES PATENT OFFICE 2,649,432

VULCANIZATION WITH ALKYL DIMETHYLOLPHENOL AND ALKANOLAMINE

Julian R. Little, Packanack Lake, N. J., assignor to United States Rubber Company, New York, N. Y., a corporation of New Jersey No Drawing. Application March 5, 1951,
Serial No. 214,010

18 Claims. (Cl. 260—41.5)

This invention relates to the vulcanization of synthetic rubber selected from the group consisting of polymers of aliphatic conjugated diolefins and copolymers of aliphatic conjugated diolefins with other copolymerizable monomeric material, which copolymers contain copolymerized therein at least 25% of aliphatic conjugated diolefin, by means of a vulcanizing agent composed of a compound having the formula

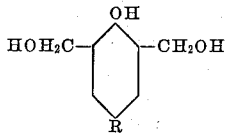

where R is alkyl, and an alkanolamine as a vulcanization accelerator. In the foregoing formula, R can be any alkyl radical and usually is an alkyl radical having from 1 to 18 carbon atoms. Examples of alkyl are methyl, ethyl, n-propyl, isopropyl, n-butyl, isobutyl, sec-butyl, tertiary-butyl, and any of the amyl, hexyl, octyl, decyl, dodecyl and octadecyl groups.

The method of the present invention comprises heating a mixture of synthetic rubber, of the type defined above, with carbon black in an amount equal to at least 15 parts per 100 parts of said rubber, the above-defined compound, and an alkanolamine.

A particularly preferred vulcanizing agent for use in the present invention is that wherein R is tertiary-butyl, i. e., the compound known as 2,6-dimethylol-4-tertiary-butylphenol.

The aforementioned vulcanizing agents can be used in widely varying amounts. I prefer, however, to use from 0.25 to 8 parts of the phenol derivative per 100 parts of rubber.

It is essential that at least about 15 parts of carbon black be used per 100 parts of the rubber. The type of carbon black is not critical. The black can be any of the reinforcing, semi-reinforcing or non-reinforcing carbon blacks commonly used in the rubber industry. It can be made by any suitable process. Examples are channel black and furnace black. Acetylene black also is operative even though it is the least reinforcing of the rubber blacks. Examples of commercial blacks which can be used include Philblack O, Wyex, Kosmos 80, Statex B, Spherron 6, P-33, Thermax and Shawinigan. Of course, the physical properties of the vulcanizates will vary considerably depending upon the type of carbon black used, as is well-known to anyone skilled in rubber compounding. So far as vulcanization is concerned, the maximum amount of carbon black is not critical. However, those skilled in the art will understand that the practical maximum is that figure at which the physical properties of the vulcanizate begin to fall off objectionably.

Examples of synthetic rubber to which my invention is applicable include copolymers of butadiene and styrene whether made by the standard, i. e., hot process or by the cold process; copolymers of butadiene and acrylonitrile, copolymers of butadiene and methyl acrylate, and homopolymers of butadiene. My invention can be applied to any rubbery polymeric aliphatic conjugated diolefin and other copolymerizable monomer. The synthetic rubber used must possess substantial olefinic unsaturation in order that it be vulcanized by the phenol derivatives of the present invention.

The alkanolamine used in accordance with the present invention is preferably a lower alkanolamine, such as the ethanolamines, i. e., monoethanolamine, diethanolamine and triethanolamine. Generally speaking the di- and tri-compounds are more active accelerators than the mono-compound.

The alkanolamine greatly increases the rate of vulcanization. In many cases the vulcanization can be effected in less than half as long by its use as without it. The products of my invention are superior to those made in the absence of the accelerator.

The amount of alkanolamine can vary widely but preferably ranges from 0.5 to 10 parts per 100 parts of the rubber.

In proceeding according to my invention, the synthetic rubber, carbon black, phenol derivative, and alkanolamine, together with any other desired materials, such as other fillers and the usual rubber compounding ingredients, are intimately mixed in any conventional manner used in the rubber industry, e. g., on a rubber mill or in an internal mixer. The compounded rubber is then converted to any desired shape and size and is vulcanized at 150 to 250° C., preferably at 165° to 225° C., in any well-known manner as in a mold under pressure or in an open container in an oven.

The vulcanization procedure of the present invention has many advantages over previously known vulcanizing processes. Among these are the following:

1. The rubber stocks vulcanized by the new process of my invention have a far better resistance to oxidative aging than does rubber vulcanized with sulfur. For example, when aged in air at 100° C., the new stocks of my invention deteriorate less than one-third as rapidly as a standard sulfur stock. Thus, these new stocks are especially useful in products which must be kept for considerable periods of time at high temperatures. Such products are curing bags for tires, rubber motor mountings, steam hose, gaskets and belts for hot machinery, conveyor belts for moving hot materials, flexible hot air ducts, hot water bottles, etc.

2. The new stocks of the present invention may be used in contact with metals such as copper, silver, etc. which are tarnished by stocks vulcanized by sulfur. The advantage of using these new non-sulfur vulcanizates for rubber-metal objects; e. g., composite rubber and metallic cloth or fabric articles, rubber-insulated wire, head lights, silverware, copperware, etc. is obvious.

3. By carrying out the vulcanization in the presence of carbon black, the amount of the phenol derivatives used as vulcanizing agents can be kept so low as to be commercially practical. For example, as indicated above, amounts ranging from 0.25 to 8 parts per 100 parts of rubber are eminently feasible. Prior art workers such as van der Meer—Dutch Patent 58,664, and Rubber Chemistry & Technology, 18, 853–73 (1945) and 20, 173–181 (1947)—reported that in most cases 40 to 50 parts of a phenolic compound were needed to vulcanize rubber in the absence of carbon black. It is well-known that the addition of carbon black to a stock containing sulfur as the vulcanizing agent decreases the effectiveness of the accelerator and stearic acid; i. e., that more of each is required in a rubber stock containing carbon black than in a gum rubber stock to attain equivalent vulcanization. Furthermore, the sulfur level cannot be decreased because of the presence of the carbon black. Consequently, the great increase in the effectiveness of the phenolic vulcanizing agents of my invention as a result of the addition of carbon black was unexpected.

4. Another advantage of my invention is that whereas no one heretofore has been able to accelerate the vulcanization of rubber by phenolic compounds, I have discovered accelerators for use with my phenol derivatives which allow much more efficient use of vulcanizing equipment by greatly reducing the time of vulcanization.

5. The compounded but unvulcanized stocks made in accordance with the principles of my invention can be processed at higher temperatures without scorching than can stocks containing sulfur as the vulcanizing agent. This is particularly advantageous when shaping articles by injection molding.

The following examples illustrate the invention more fully. All parts mentioned in this specification are by weight.

Example 1

The following stocks were mixed and vulcanized in a press at 195° C. for the times shown, and then tested at room temperature in a conventional manner:

| Stock | A-1 | B-1 | A-2 | B-2 | C |
|---|---|---|---|---|---|
| GR-S | 100 | 100 | 100 | 100 | 100 |
| Philblack O a | 50 | 50 | 50 | 50 | 50 |
| 2,6-Dimethylol-4-tert.butylphenol | 2 | 2 | 2 | 2 | 1.5 |
| Triethanolamine | | 2 | | 2 | 1.5 |
| Time of vulcanization (min.) | 30 | 30 | 60 | 60 | 120 |
| Tensile strength (p. s. i.) | 650 | 2,540 | 1,120 | 2,990 | 1,900 |
| Elongation (percent) | 700 | 510 | 680 | 430 | 280 |
| Modulus at 200% elongation (p. s. i.) | 200 | 540 | 265 | 735 | 1,145 | a A high abrasion furnace black.

The above example shows the tremendous increase in the rate of vulcanization due to the triethanolamine. Stocks A-1 and A-2, which are not made according to my invention, are shown merely for comparison.

Example 2

The following stocks were mixed, vulcanized and tested as described in Example 1:

| Stock | D-1 | D-2 | E-1 | E-2 |
|---|---|---|---|---|
| GR-S masterbatch a | 155 | 155 | 155 | 155 |
| 2,6-Dimethylol-4-tert.butylphenol | 2 | 2 | 2 | 2 |
| Triethanolamine | | | 2 | 2 |
| Vulcanization time (min.) | 60 | 120 | 60 | 120 |
| Tensile Strength: | | | | |
| Green (p. s. i.) | 835 | 1,375 | 1,920 | 2,210 |
| Aged (p. s. i.) | 1,230 | 1,380 | 1,470 | 1,355 |
| Change (percent) | +47 | 0 | −23 | −39 |
| Elongation: | | | | |
| Green (percent) | 475 | 445 | 465 | 415 |
| Aged (percent) | 355 | 295 | 335 | 265 |
| Change (percent) | −26 | −34 | −28 | −36 |
| Modulus at 200% elongation: | | | | |
| Green (p. s. i.) | 400 | 580 | 685 | 820 |
| Aged (p. s. i.) | 670 | 855 | 780 | 945 |
| Change (percent) | +68 | +47 | +14 | +15 | a Pre-mixed masterbatch of 100 parts GR-S and 55 parts Philblack.

The foregoing stocks were prepared by mixing and vulcanizing at 195° C. for the time indicated. The vulcanizates were tested unaged (green) at room temperature. Portions of each vulcanizate were aged for six days in air at 100° C. and then tested at room temperature.

For comparison, a standard stock vulcanized with sulfur was prepared, as follows:

STOCK F

| | |
|---|---|
| GR-S | 100 |
| Philblack O | 50 |
| Zinc oxide | 5 |
| Paraflux (asphaltic plasticizer) | 5 |
| Stearic acid | 1.5 |
| Sulfur | 2 |
| Mercaptobenzothiazole | 1.5 |
| Diphenyl guanidine | 0.4 |

This stock was vulcanized 45 min. at 145° C., and a portion aged 2 days in air at 100° C. The test data are:

| | Green | Aged | Change, percent |
|---|---|---|---|
| Tensile Strength | 2,700 p. s. i. | 2,000 p. s. i. | −26 |
| Elongation | 510% | 280% | −45 |
| Modulus at 200% Elongation | 630 p. s. i. | 1,300 p. s. i. | +106 |

It is evident that the conventional Stock F vulcanized with sulfur has aged (stiffened) proportionately more in two days than have my new stocks in 6 days. It is also apparent that Stocks E-1 and E-2, which are made according to my invention, withstood this drastic aging test somewhat better than Stocks D-1 and D-2, which are shown merely for comparison.

Example 3

The following stocks were mixed, vulcanized at the temperatures shown, and tested as in Example 1:

| Stock | A-2 | A-3 | B-2 | B-3 |
|---|---|---|---|---|
| GR-S | 100 | 100 | 100 | 100 |
| Philblack O | 50 | 50 | 50 | 50 |
| 2,6-Dimethylol-4-tert. butylphenol | 2 | 2 | 2 | 2 |
| Triethanolamine | | | 2 | 2 |
| Temperature of cure (° C.) | 195 | 165 | 195 | 165 |
| Time of cure (min.) | 60 | 120 | 60 | 120 |
| Tensile strength (p. s. i.) | 1,120 | 622 | 2,990 | 2,470 |
| Elongation (percent) | 680 | 600 | 430 | 550 |
| Modulus at 250% elongation (p. s. i.) | 265 | 195 | 735 | 375 |

The above example shows that the temperature of vulcanization is not critical, i. e., that the accelerating effect which is the subject of my invention takes place at widely differing temperatures.

*Example 4*

The following stocks were mixed, vulcanized for 240 minutes at 165° C., and tested as in Example 1.

| Stock | F | G | H | I |
|---|---|---|---|---|
| GR-S | 100 | 100 | 100 | 100 |
| Philblack O | 50 | 50 | 50 | 50 |
| 2,6-Dimethylol-4-methylphenol | 2 | 2 | | |
| 2,6-Dimethylol-4-octylphenol | | | 2 | 2 |
| Triethanolamine | | 2 | | 2 |
| Tensile strength (p. s. i.) | 1,150 | 2,810 | 860 | 2,110 |
| Elongation (percent) | 480 | 430 | 520 | 390 |
| Modulus at 200% elongation (p. s. i.) | 320 | 635 | 265 | 525 |

*Example 5*

The following stocks were mixed, vulcanized for 30 minutes at 195° C. and tested as in Example 1.

| Stock | A-1 | J | K |
|---|---|---|---|
| GR-S | 100 | 100 | 100 |
| Philblack O | 50 | 50 | 50 |
| 2,6-Dimethylol-4-tert. butylphenol | 2 | 2 | 2 |
| Diethanolamine | | 2 | |
| Monoethanolamine | | | 2 |
| Tensile strength (p. s. i.) | 650 | 1,805 | 1,210 |
| Elongation (percent) | 700 | 665 | 760 |
| Modulus at 200% elongation (p. s. i.) | 200 | 250 | 160 |

The tensile strength data show that amines considerably accelerate the vulcanization.

Having thus described my invention, what I claim and desire to protect by Letters Patent is:

1. The method of vulcanizing synthetic rubber selected from the group consisting of polymers of aliphatic conjugated diolefins and copolymers of an aliphatic conjugated diolefin and another monomer, which copolymers contain at least 25% of an aliphatic conjugated diolefin, which comprises heating a mixture of said rubber, carbon black in an amount equal to at least 15 parts per 100 parts of said rubber, a compound having the formula

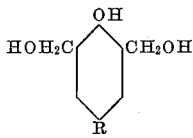

where R is alkyl in amount equal to from 0.25 to 8 parts per 100 parts of said rubber as the sole vulcanizing agent, and an alkanolamine in amount equal to from 0.5 to 10 parts per 100 parts of said rubber as a vulcanization accelerator.

2. The method of vulcanizing synthetic rubber selected from the group consisting of polymers of aliphatic conjugated diolefins and copolymers of an aliphatic conjugated diolefin and another monomer, which copolymers contain at least 25% of an aliphatic conjugated diolefin, which comprises heating a mixture of said rubber, carbon black in an amount equal to at least 15 parts per 100 parts of said rubber, a compound having the formula

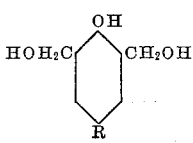

where R is an alkyl in an amount equal to from 0.25 to 8 parts per 100 parts of said rubber as the sole vulcanizing agent, and triethanolamine in amount equal to from 0.5 to 10 parts per 100 parts of said rubber as a vulcanization accelerator.

3. The method of vulcanizing synthetic rubber selected from the group consisting of polymers of aliphatic conjugated diolefins and copolymers of an aliphatic conjugated diolefin and another monomer, which copolymers contain at least 25% of an aliphatic conjugated diolefin, which comprises heating a mixture of said rubber, carbon black in an amount equal to at least 15 parts per 100 parts of said rubber, a compound having the formula

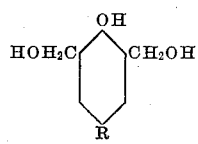

where R is alkyl in amount equal to from 0.25 to 8 parts per 100 parts of said rubber as the sole vulcanizing agent, and diethanolamine in amount equal from 0.5 to 10 parts per 100 parts of said rubber as a vulcanization accelerator.

4. The method of vulcanizing synthetic rubber selected from the group consisting of polymers of aliphatic conjugated diolefins and copolymers of an aliphatic conjugated diolefin and another monomer, which copolymers contain at least 25% of an aliphatic conjugated diolefin, which comprises heating a mixture of said rubber, carbon black in an amount equal to at least 15 parts per 100 parts of said rubber, a compound having the formula

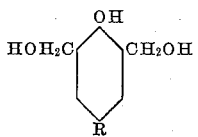

where R is alkyl in amount equal to from 0.25 to 8 parts per 100 parts of said rubber as the sole vulcanizing agent, and monoethanolamine in amount equal to from 0.5 to 10 parts per 100 parts of said rubber as a vulcanization accelerator.

5. The method of claim 1 wherein said synthetic rubber is a copolymer of butadiene and styrene.

6. The method of vulcanizing synthetic rubber selected from the group consisting of polymers of aliphatic conjugated diolefins and copolymers of an aliphatic conjugated diolefin and another monomer, which copolymers contain at least 25% of an aliphatic conjugated diolefin, which comprises heating a mixture of said rubber, carbon black in an amount equal to at least 15 parts per 100 parts of said rubber, 2,6-dimethylol-4-tertiarybutylphenol in amount equal to from 0.25 to 8 parts per 100 parts of said rubber as the sole vulcanizing agent, and an alkanolamine in amount equal to from 0.5 to 10 parts per 100 parts of said rubber as a vulcanization accelerator.

7. The method of vulcanizing synthetic rubber selected from the group consisting of polymers of aliphatic conjugated diolefins and copolymers of an aliphatic conjugated diolefin and another monomer, which copolymers contain at least 25% of an aliphatic conjugated diolefin, which comprises heating a mixture of said rubber, carbon black in an amount equal to at least 15 parts per 100 parts of said rubber, 2,6-dimethylol-4-tertiarybutylphenol in amount equal to from 0.25 to 8 parts per 100 parts of said rubber as the sole vulcanizing agent, and triethanolamine in amount equal to from 0.5 to 10 parts per 100 parts of said rubber as a vulcanization accelerator.

8. The method of vulcanizing synthetic rubber selected from the group consisting of polymers of aliphatic conjugated diolefins and copolymers of an aliphatic conjugated diolefin and another monomer, which copolymers contain at least 25% of an aliphatic conjugated diolefin, which comprises heating a mixture of said rubber, carbon black in an amount equal to at least 15 parts per 100 parts of said rubber, 2,6-dimethylol-4-tertiarybutylphenol in amount equal to from 0.25 to 8 parts per 100 parts of said rubber as the sole vulcanizing agent, and diethanolamine in amount equal to from 0.5 to 10 parts per 100 parts of said rubber as a vulcanization accelerator.

9. The method of vulcanizing synthetic rubber selected from the group consisting of polymers of aliphatic conjugated diolefins and copolymers of an aliphatic conjugated diolefin and another monomer, which copolymers contain at least 25% of an aliphatic conjugated diolefin, which comprises heating a mixture of said rubber, carbon black in an amount equal to at least 15 parts per 100 parts of said rubber, 2,6-dimethylol-4-tertiarybutylphenol in amount equal to from 0.25 to 8 parts per 100 parts of said rubber as the sole vulcanizing agent, and monoethanolamine in amount equal to from 0.5 to 10 parts per 100 parts of said rubber as a vulcanization accelerator.

10. A vulcanizate of a mixture of synthetic rubber selected from the group consisting of polymers of aliphatic conjugated diolefins and copolymers of an aliphatic conjugated diolefin and another monomer, which copolymers contain at least 25% of an aliphatic conjugated diolefin, carbon black in an amount equal to at least 15 parts per 100 parts of said rubber, a compound having the formula

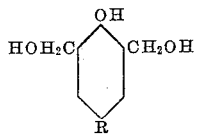

where R is alkyl in amount equal to from 0.25 to 8 parts per 100 parts of said rubber as the sole vulcanizing agent, and an alkanolamine in amount equal to from 0.5 to 10 parts per 100 parts of said rubber as a vulcanization accelerator.

11. A vulcanizate of a mixture of synthetic rubber selected from the group consisting of polymers of aliphatic conjugated diolefins and copolymers of an aliphatic conjugated diolefin and another monomer, which copolymers contain at least 25% of an aliphatic conjugated diolefin, carbon black in an amount equal to at least 15 parts per 100 parts of said rubber, a compound having the formula

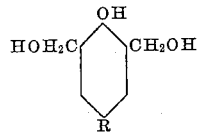

where R is alkyl in amount equal to from 0.25 to 8 parts per 100 parts of said rubber as the sole vulcanizing agent, and triethanolamine in amount equal to from 0.5 to 10 parts per 100 parts of said rubber as a vulcanization accelerator.

12. A vulcanizate of a mixture of synthetic rubber selected from the group consisting of polymers of aliphatic conjugated diolefins and copolymers of an aliphatic conjugated diolefin and another monomer, which copolymers contain at least 25% of an aliphatic conjugated diolefin, carbon black in an amount equal to at least 15 parts per 100 parts of said rubber, a compound having the formula

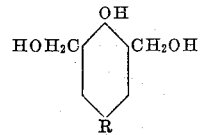

where R is alkyl in amount equal to from 0.25 to 8 parts per 100 parts of said rubber as the sole vulcanizing agent, and diethanolamine in amount equal to from 0.5 to 10 parts per 100 parts of said rubber as a vulcanization accelerator.

13. A vulcanizate of a mixture of synthetic rubber selected from the group consisting of polymers of aliphatic conjugated diolefins and copolymers of an aliphatic conjugated diolefin and another monomer, which copolymers contain at least 25% of an aliphatic conjugated diolefin, carbon black in an amount equal to at least 15 parts per 100 parts of said rubber, a compound having the formula

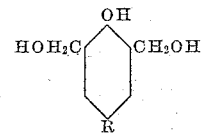

where R is alkyl in amount equal to from 0.25 to 8 parts per 100 parts of said rubber as the sole vulcanizing agent, and monoethanolamine in amount equal to from 0.5 to 10 parts per 100 parts of said rubber as a vulcanization accelerator.

14. A vulcanizate as set forth in claim 10 wherein said synthetic rubber is a copolymer of butadiene and styrene.

15. A vulcanizate of a mixture of synthetic rubber selected from the group consisting of polymers of aliphatic conjugated diolefins and copolymers of an aliphatic conjugated diolefin and another monomer, which copolymers contain at least 25% of an aliphatic conjugated diolefin, carbon black in an amount equal to at least 15 parts per 100 parts of said rubber, 2,6-dimethylol-4-tertiarybutylphenol in amount equal to from 0.25 to 8 parts per 100 parts of said rubber as the sole vulcanizing agent, and an alkanolamine in amount equal to from 0.5 to 10 parts per 100 parts of said rubber as a vulcanization accelerator.

16. A vulcanizate of a mixture of synthetic rubber selected from the group consisting of polymers of aliphatic conjugated diolefins and copolymers of an aliphatic conjugated diolefin and another monomer, which copolymers contain at least 25% of an aliphatic conjugated diolefin, carbon black in an amount equal to at least 15 parts per 100 parts of said rubber, 2,6-dimethylol-4-tertiarybutylphenol in amount equal to from 0.25 to 8 parts per 100 parts of said rubber as the sole vulcanizing agent, and triethanolamine in amount equal to from 0.5 to 10 parts per 100 parts of said rubber as a vulcanization accelerator.

17. A vulcanizate of a mixture of synthetic rubber selected from the group consisting of polymers of aliphatic conjugated diolefins and copolymers of an aliphatic conjugated diolefin and another monomer, which copolymers contain at least 25% of an aliphatic conjugated diolefin, carbon black in an amount equal to at least 15 parts per 100 parts of said rubber, 2,6-dimethylol-4-tertiarybutylphenol in amount equal to from 0.25 to 8 parts per 100 parts of said rubber as the sole vulcanizing agent, and diethanolamine in amount equal to from 0.5 to 10 parts per 100 parts of said rubber as a vulcanization accelerator.

18. A vulcanizate of a mixture of synthetic rubber selected from the group consisting of polymers of aliphatic conjugated diolefins and copolymers of an aliphatic conjugated diolefin and another monomer, which copolymers contain at least 25% of an aliphatic conjugated diolefin, carbon black in an amount equal to at least 15 parts per 100 parts of said rubber, 2,6-dimethylol-4-tertiarybutylphenol in amount equal to from 0.25 to 8 parts per 100 parts of said rubber as the sole vulcanizing agent, and monoethanolamine in amount equal to from 0.5 to 10 parts per 100 parts of said rubber as a vulcanization accelerator.

JULIAN R. LITTLE.

References Cited in the file of this patent

UNITED STATES PATENTS

| Number | Name | Date |
| --- | --- | --- |
| 1,802,752 | Cadwell et al. | Apr. 28, 1931 |
| 2,026,442 | Somerville | Dec. 31, 1935 |

OTHER REFERENCES

Ser. No. 357,662, Wildschut (A. P. C.), published April 20, 1943.